(12) United States Patent
Valadez (10) Patent No.: US 8,744,157 B2
(45) Date of Patent: Jun. 3, 2014

(54) SYSTEM AND METHOD FOR CANDIDATE GENERATION AND NEW FEATURES DESIGNED FOR THE DETECTION OF FLAT GROWTHS

(75) Inventor: Gerardo Hermosillo Valadez, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1014 days.

(21) Appl. No.: 12/777,595

(22) Filed: May 11, 2010

(65) Prior Publication Data

US 2010/0284588 A1    Nov. 11, 2010

Related U.S. Application Data

(60) Provisional application No. 61/176,984, filed on May 11, 2009.

(51) Int. Cl.
*G06K 9/00* (2006.01)
*G06T 7/40* (2006.01)
*G06T 7/00* (2006.01)
*G06K 9/46* (2006.01)

(52) U.S. Cl.
CPC ............. *G06T 7/0012* (2013.01); *G06T 7/403* (2013.01); *G06T 2207/10088* (2013.01); *G06T 2207/10081* (2013.01); *G06T 2207/30032* (2013.01); *G06K 9/4609* (2013.01); *G06K 2209/053* (2013.01)
USPC .......................................... 382/131; 382/132

(58) Field of Classification Search
USPC ........................................................ 382/131
See application file for complete search history.

(56) References Cited

U.S. PATENT DOCUMENTS

2010/0111396 A1*   5/2010  Boucheron .................... 382/133

* cited by examiner

*Primary Examiner* — Tran Nguyen
(74) *Attorney, Agent, or Firm* — Peter R. Withstandley (57) ABSTRACT

A method for generating candidates from a digital image includes considering at least one point x that may lie on a polypoid structure, determining whether the point x satisfies a first predetermined set of conditions, for each point x that satisfies the predetermined set of conditions, identifying each neighbor point y within a predetermined distance of point x that satisfies a second predetermined set of conditions, determining a gradient vector $v_1$ for point x and identifying a first half-line to which the gradient vector $v_1$ belongs, determining a gradient vector $v_2$ for point y and identifying a second half-line to which the gradient vector $v_2$ belongs, calculating an intersection score that represents how close the first and second half-lines come to intersecting, and identifying point x as a candidate when a candidate score is greater than a predetermined value, wherein the candidate score is the sum of intersection scores for all neighbor points y.

22 Claims, 8 Drawing Sheets

FOLD BENDING
FIG. 8A

FOLD JUNCTION
FIG. 8D

ON RECTAL TUBE
FIG. 8B

CRUMPLED FOLD
FIG. 8E

FOLD'S END
FIG. 8C

FOLD'S JUNCTION + BENDING
FIG. 8F

SYSTEM AND METHOD FOR CANDIDATE GENERATION AND NEW FEATURES DESIGNED FOR THE DETECTION OF FLAT GROWTHS

CROSS-REFERENCE TO RELATED APPLICATION

This application claims the benefit of U.S. Provisional Patent Application No. 61/176,984, filed May 11, 2009, entitled "System And Method For Candidate Generation And New Features Designed For The Detection Of Flat Polyps," the contents of which are herein incorporated by reference in their entirety.

TECHNICAL FIELD

The present disclosure generally relates to medical image processing and more particularly to the detection of candidates from digital medical images.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical structures such as cysts, tumors, polyps, etc. Given the amount of image data generated by any given image scan; it is preferable that an automatic technique should point out anatomical features in the selected regions of an image to a doctor for further diagnosis of any disease or condition.

One general method of automatic image processing employs feature based recognition techniques to determine the presence of anatomical structures in medical images. However, feature based recognition techniques can suffer from accuracy problems.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images. One type of CAD candidate generator relies upon the cutting plane images provided by MRI and CT scanners. Another is a divergent gradient field response (DGFR) candidate generator (CG) and is considered a good replacement for the cutting planes candidate generator for the detection of possible abnormalities. The DGFR candidate generator is considered an improved technique over the cutting planes candidate generator because it overcomes the main limitation of the cutting planes CG, namely, its 2D limitations. The main idea in DGFR is to detect areas where the (inverted) gradient of the image correlates well with a 3D divergent gradient field, such as the one obtained when considering the (inverted) gradient of 3D Gaussian function. The same principle applies to "convergent" gradient fields and the various concepts can be illustrated using either convergent or divergent fields interchangeably.

Figure 1:
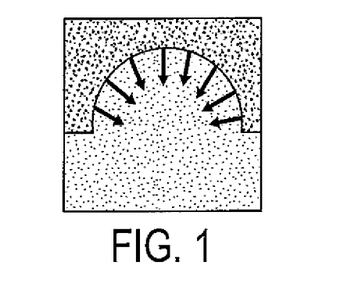
FIG. 1 illustrates an exemplary hemispherical growth attached to a tissue wall, according to an embodiment of the invention.
Figure 2:
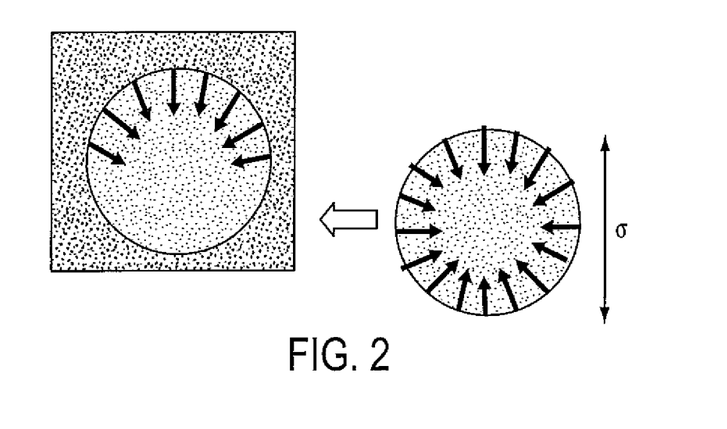
FIG. 2 illustrates the correlation of the image gradient of a growth with a gradient of a Gaussian, according to an embodiment of the invention.

This model of a convergent gradient field is well adapted to finding possible anatomical abnormalities such as, for example, cysts, tumors, and polyps from digital medical images. For example, the DGFR candidate generator is well adapted to identifying possible colon polyps from computed tomography (CT) images, since most of the polyps have roughly the shape of a hemisphere attached to the colon wall. The image gradient field for a hemispherical growth is roughly convergent towards the core of the polyp. FIG. 1 illustrates an exemplary hemispherical polyp attached to a colon wall with gradient field vectors pointing toward the core of the polyp. The approach of the DGFR technique is to perform a vector correlation of the image gradient with the gradient of a Gaussian. If the variance σ of the Gaussian is well adapted to the size of the polyp, this correlation will be high at the core or center of the polyp. In order to handle polyps of various sizes, the correlation with the divergent vector field is performed at multiple values of σ, and the responses at the various scales are then combined to produce candidates, usually by taking the location of the maximum response across scales and then applying a threshold to this "combined" response image. FIG. 2 illustrates the correlation of the image gradient of an exemplary polyp with a gradient of a Gaussian of standard deviation σ.

However, such conventional image processing and analysis systems and techniques as described above still often miss potential candidates within a digital medical image. This is due in large part to the fact that such anatomical abnormalities are often not as close to perfectly hemi-spherical as the above DGFR system assumes.

Therefore, a need exists for an improved system and method for detecting and generating candidates from a digital medical image that can better detect asymmetric, flat, and otherwise difficult to detect anatomic structures.

SUMMARY OF THE INVENTION

According to an aspect of the invention, a method is provided for generating candidates from a digital image, the method including considering at least one point x that may lie on a polypoid structure, and determining whether the point x satisfies a first predetermined set of conditions. For each point x that satisfies the predetermined set of conditions, the method includes identifying each neighbor point y within a predetermined distance of point x that satisfies a second predetermined set of conditions, determining a gradient vector $v_1$ for point x and identifying a first half-line to which the gradient vector $v_1$ belongs, determining a gradient vector $v_2$ for point y and identifying a second half-line to which the gradient vector $v_2$ belongs, calculating an intersection score that represents how close the first and second half-lines come to intersecting, and identifying point x as a candidate when a candidate score is greater than a predetermined value. The candidate score is the sum of intersection scores for all points y. In accordance with an aspect of the invention, the intersection score is defined by $$-\frac{v_1 \times (y-x)}{|v_1 \times (y-x)|} \cdot \frac{v_1 \times v_2}{|v_1 \times v_2|},$$

where $v_1$ is the gradient vector at point x and $v_2$ is the gradient vector at point y. Determining whether a point x satisfies the first predetermined set of conditions can include determining that the point x is located on the air-tissue interface, and determining that the point x has a gradient magnitude greater than a predetermined gradient value. According to a further aspect of the invention, determining whether a point y satisfies the second predetermined conditions can include determining that the point y is located on the air-tissue interface, determining that the point y has a gradient magnitude greater than a predetermined gradient value, determining that the point y is located within a predetermined distance range of the point x, determining that the point y is located below the point x, and determining that an angle between gradient vector $v_1$ and gradient vector $v_2$ is within a predetermined angle range. According to another aspect of the invention, determining that the point x is located on the air-tissue interface further includes determining that an image intensity at the point x is greater than a first intensity threshold and less than a second intensity threshold. In accordance with yet another aspect of the invention, determining that the point y is located on the air-tissue interface further includes determining that an image intensity at the point y is greater than a first intensity threshold and less than a second intensity threshold. Determining that the point y is located below the point x can further include determining that $v_1(y-x)>0$. Considering at least one point x can further include considering all points in the digital image that may lie on a polypoid structure, and determining whether each point satisfies a first predetermined set of conditions. According to a further aspect of the invention, the method can include determining that a point x identified as a candidate is within a predetermined distance of at least one neighbor point x also identified as a candidate, and merging together those points x each identified as a candidate into a single merged candidate. Merging together those points x each identified as a candidate can include, for each point x identified as a candidate, initializing a merged score as the candidate score of a current selected candidate point x, and, for each neighbor point x identified as a candidate, resetting the merged score to candidate score for neighbor candidate point x if the candidate score for neighbor candidate point x is greater than the merged score. According to a further aspect of the invention, the method can include, for each selected candidate point x, counting a number N of neighboring candidate points x that are within a maximum merge distance of the selected point x and retaining those selected candidate points x for whom the number N is greater than a predetermined minimum merge count. In accordance with yet another aspect of the invention, the method can include defining a plurality of rings about the single merged candidate, the plurality of rings having constant width and increasing radius from the single merged point, calculating a number $N_y$ of neighbors y within a predefined distance range of the point x where the points y are on the air-tissue interface and have a gradient magnitude greater than the predetermined value, calculating a number $N_c$ of neighbors y having an intersection score with the single merged candidate greater than a predetermined threshold, accumulating the intersection scores of all $N_c$ points y with the single merged candidate, and projecting a component of the gradient vector $v_2$ at each point y onto a plane normal to the gradient vector $v_1$ at the single merged candidate, where the projected component $v_x$ is defined as $$v_x = v_2 - (\hat{v}_1 \cdot v_2)\hat{v}_1.$$

According to another aspect of the invention, there is provided a program storage device readable by a computer, tangibly embodying a program of instructions executable by the computer to perform the method steps for generating candidates from a digital image.

DETAILED DESCRIPTION OF THE INVENTION

Exemplary embodiments of the invention as described herein generally include systems and methods for generating candidates from a digital image. Many of the examples given herein relate to generating candidates for polyp detection in digital colonoscopy. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. In particular, while polyp detection in digital colonoscopy is described throughout, the methods and systems described herein are well adapted for use in detection of growths at any tissue interface in the body that can be imaged using known imaging techniques such as MRI, CT, PET, etc.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Although DGFR CG had been successfully used for the detection of polyps in the analysis of digital images of the colon, there are come practical issues that effect performance. Relatively minor issues include a high memory cost and long computation time compared to the cutting planes CG methods, but more fundamental issues include the fact that its high sensitivity was coupled with an almost tripled number of marks and that the candidate location was given as the center of the polyp, rather than its tip. No experiment had been performed to test the full set of colon CAD features with a larger set of CG candidates to see if the extra false positives (FPs) could be eliminated by the classification stage without hurting the extra-sensitivity.

The computational cost can be shown to result from three convolutions required for the vector correlation, which can be replaced with a single scalar convolution between a Gaussian kernel and the divergence of the normalized image gradient field. In addition, in the absence of internal thresholds on the gradient magnitude, which are present in DGFR CG, the divergence of the normalized gradient field corresponds to the mean curvature function. This result yields a much faster algorithm and provides insight and an alternative way to express what the DGFR response is measuring: a weighted average of the divergence of the normalized gradient field over regions defined by the scale parameter σ. This way of describing the response leads to an important realization: candidates for polyp tips should be locations with a relatively high divergence of the gradient field as measured between the gradient at the candidate and the gradient at locations on the colon surface at various distances from the candidate. The summation over the region is a way to "measure" this divergence at various distances from the tip, but is limited by issues relating to the tip versus center location of the candidate.

Candidate Location and Scale Selection

Figure 3:
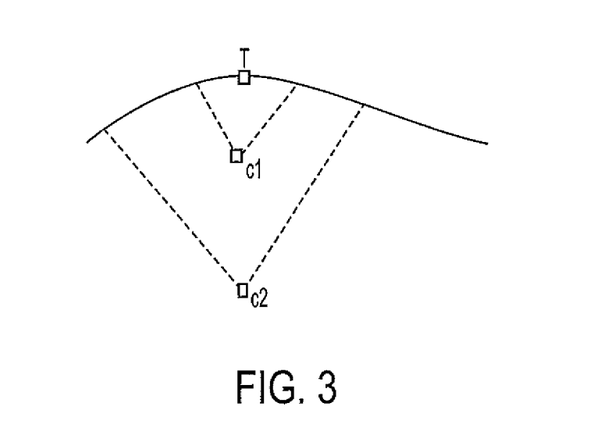
FIG. 3 illustrates how a flat growth can produce high response at two different scales, according to an embodiment of the invention.

Some structures, such as flat polyps or other flat growths, may have a shape that corresponds more to a half ellipsoid than a hemisphere. In this case, correlation with a single scale at a time is not well adapted, since the same candidate will produce high response at varying scales, making it challenging to merge multiple scales at a consistent location. Roughly speaking, the DGFR response will be maximal at various distances from the tip depending of the scale, making the response more blurred and less specific. For example, FIG. 3 illustrates how a flat growth such as a flat polyp can produce a high response for the same tip T at two different scales and two different candidate locations $C_1$ and $C_2$. Merging these two locations and scales into a single candidate seems a non-trivial task that is not explicitly addressed by the DGFR CG. This task can make the combined response weaker than it should for flat growths since no single choice of candidate or scale provides the desired "full" response.

Low Specificity of the Divergence of a Vector Field

Figure 4A:
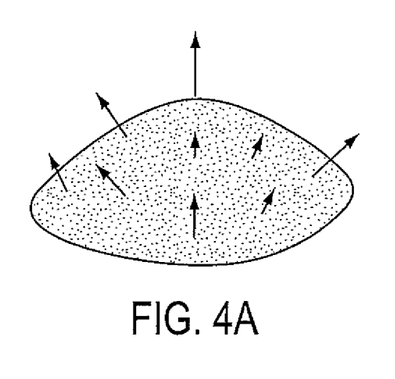
FIGS. 4(a)-(b) illustrate how the local divergence of the gradient field and the magnitude of the total surface of the correlation sphere that is divergent compete to produce a strong DGFR response, according to an embodiment of the invention.
Figure 4B:
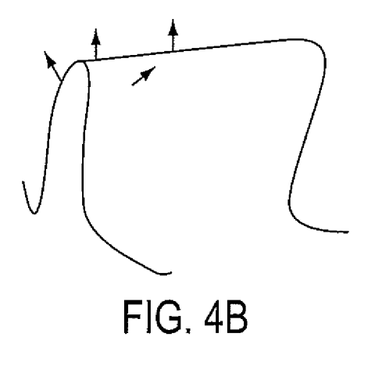

Many structures present a locally divergent gradient field. The magnitude of the response of DGFR depends on two factors: (1) how divergent is the field locally; and (2) how much of the total surface of the correlation sphere is divergent. These two factors compete with each other in producing a strong response, such that the final response can be similar for a flat growth such as a flat polyp (low divergence over a relatively large portion of the sphere) or for the ridge of a fold (strong divergence over a small portion of the sphere surface). FIGS. 4(a)-(b) shows this effect schematically and with examples from the colon surface (FIG. 4(a)), in which locally convergent gradient fields are shown for normal structures and a flat polyp (FIG. 4(b)).

Low Specificity of the Local Average

Computing a local weighted average of the gradient field divergence is also challenging. There is no single criterion to determine how this average is to be computed, for example, whether to ignore all gradient vectors that are above the plane tangent to the colon surface at the candidate tip. This issue is aggravated by the fact that vector field "divergence" is very un-specific; the divergence can measure almost arbitrary changes in the direction of the vectors.

A New Candidate Generator

Coming back to FIGS. 3 and 4(a)-(b) that illustrate the issues mentioned previously, it can be seen that there is a property that appears to address almost all of these issues (except for the last one: the low specificity of the local averaging): for growths such as polyps, the half lines formed by the candidate tip and the gradient on one hand and by a neighbor location on the tissue surface (e.g., the colon surface) and its corresponding gradient on the other hand, should (almost) intersect at a single point. For flat growths such as flat polyps, the half lines will intersect or nearly intersect at different locations depending on the neighbor, but they will have a point of intersection or near intersection, whereas for a fold ridge very few neighbor locations sustain an intersecting or nearly intersecting half line with the one defined at the candidate tip, even though the gradient field has high divergence.

Figure 5:
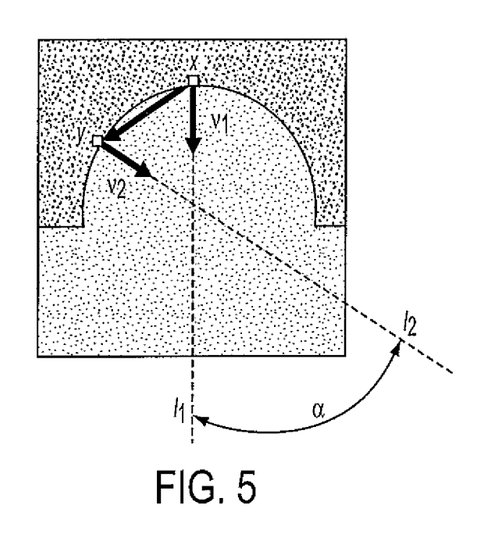
FIG. 5 illustrates an efficient way of predicting how closely two half-lines come to intersecting at a single point, according to an embodiment of the invention.

According to an embodiment of the invention, there is an efficient way of predicting whether or not two half-lines intersect at a single point. With notations referring to FIG. 5, depicting a 3D polypoid structure, the two dotted half-lines $l_1$, $l_2$ intersect at a single point if and only if, the quantity $$s = \frac{v_1 \times (y-x)}{|v_1 \times (y-x)|} \cdot \frac{v_1 \times v_2}{|v_1 \times v_2|},$$

referred to as the intersection score of x and y, is defined and equal to one, where x and y are points on a candidate surface, and $v_1$, $v_2$ are the image gradients at points x and y, respectively. Notice that s is equal to one independently of the angle $\alpha$, as long as the half-lines intersect at a single point.

To re-phrase the idea, a solution according to an embodiment of the invention for locating candidates is: let the candidate be the tip rather than the center of the structure of interest. A solution according to an embodiment of the invention for both scale selection and the low specificity of the gradient divergence is to let the gradient field at the various locations around the candidate tip define a set of half-lines that can intersect the half-line defined by the gradient at the tip, independently of how far the half-lines do intersect it but rather than just having converging projections onto a common plane. In addition, a method according to an embodiment of the invention can address the low specificity of the smoothing operation by replacing it with an explicit non-linear algorithm on the neighborhood of each candidate tip as follows.

For each voxel x with intensities within a tissue interface such as a blood-tissue interface, or an air-tissue interface and with sufficiently large image gradient on the tissue surface:

$$\alpha_1 < I(x) < \alpha_2, |v_1| < \alpha_3 \quad (1)$$

where $v_1$ is the gradient of the image I at point x, consider all voxels y that satisfy the following conditions.
The voxel y is in the air-tissue interface:

$$\alpha_1 < I(y) < \alpha_2 \quad (2.1)$$

The gradient $v_2$ at point y is sufficiently large:

$$|v_2| > \alpha_3 \quad (2.2)$$

The distance to the candidate x is within a given range:

$$\alpha_4 < |y-x| < \alpha_5 \quad (2.3)$$

The neighbor y lies "below" the candidate x:

$$v_1 \cdot (y-x) > 0 \quad (2.4)$$

The angle between the two gradient vectors is within a given range:

$$\theta_l < v_1 \cdot v_2 < \theta_u. \quad (2.5)$$

A valid neighbor is a neighbor y that satisfies the above conditions 2.1 to 2.5. Then, each neighbor location y contributes to a score at x a value $s_y$ given by the intersection score of x and y:

$$s_y = \frac{v_1 \times (y-x)}{|v_1 \times (y-x)|} \cdot \frac{v_1 \times v_2}{|v_1 \times v_2|}, \quad (3)$$

whenever $s_y$ is above a predefined intersection score threshold $\theta_t$ (generally close to one, for example, 0.7, 0.8, etc.), and an angle $\theta$ between the two gradients $v_1$, $v_2$ is within the predefined range $\theta_l < \theta < \theta_u$. A valid neighbor y whose value of $s_y$ is above the predefined intersection score threshold $\theta_t$ is said to be a substantially coplanar neighbor of candidate x. According to an embodiment of the invention, exemplary, non-limiting values for these constants for a CT image are as follows: $\alpha_1 = 200$ HU, $\alpha_2 = 700$ HU, $\alpha_3 = 250$ HU/mm, $\theta_l = 3$ degrees, and $\theta_u = 55$ degrees. Note that these values and units may differ for images acquired through other imaging modalities, such as magnetic resonance imaging. For all candidate points x, those $s_y$'s for neighbors that are substantially coplanar with candidate x are summed, $$S = \sum_y s_y, \quad (4)$$

where S is referred to as the candidate score, subject to the optional further condition that at least a fraction $\phi$ of valid neighbors of y are also substantially coplanar with x. $\phi$ may be referred to as the coplanarity fraction. Exemplary, non-limiting values for $\theta_t$ and $\phi$ are 0.60 and 0.80, respectively. Finally, only those points x whose value of S is greater than a minimum candidate score $S_{min}$ are selected as candidates. An exemplary, non-limiting value for $S_{min}$ is 15.0. A candidate generator according to an embodiment of the invention for a CAD system that relies on EQ. (3) above to determine if line segments extended from gradient vectors intersect or nearly intersect is referred to as a needle CG.

The result could be depicted as clusters of marks, with one mark for each accepted candidate. Since many of these candidates would refer to a same growth or polyp, the number of candidates is reduced by combining (or merging) candidates that are near another candidate, that is, within a maximum merge distance $d_1$, keeping only the strongest candidate. According to an embodiment of the invention, an exemplary, non-limiting value for $d_1$ is 10 mm. Thus, after the candidates are selected, for each selected candidate, the system counts the number of neighboring candidates whose candidate score S is greater than a minimum threshold $\beta_1$. According to some embodiments of the invention, minimum threshold $\beta_1$ is equal to the minimum candidate score $S_{min}$. Further, optionally, according to some embodiments of the invention, the number of neighboring candidates should be greater than a minimum merge count $\beta_2$ for the selected candidate to be retained for merging. In other embodiments of the invention, the minimum merge count $\beta_2$ may be set to one.

Next, the selected candidates are visited. For each currently visited candidate x, the system initializes a merged score as the candidate score S for current candidate x and visits the neighboring candidates y that are within the maximum merge distance $d_1$ of the current candidate x. However, if one of the neighboring candidates y has candidate score that is greater than a current merged score, the merged score is reset to the candidate score S for that candidate y. The effect of the merging operation is to find the candidate with the strongest candidate score S within a cluster of candidates within the maximum merge distance $d_1$ of each other. After performing the merging, there is presumably one candidate per potential growth or polyp, referred to herein as the merged candidate or merged candidate point, and the merged candidate point is often associated with a tip of the potential growth or polyp.

Figure 11:
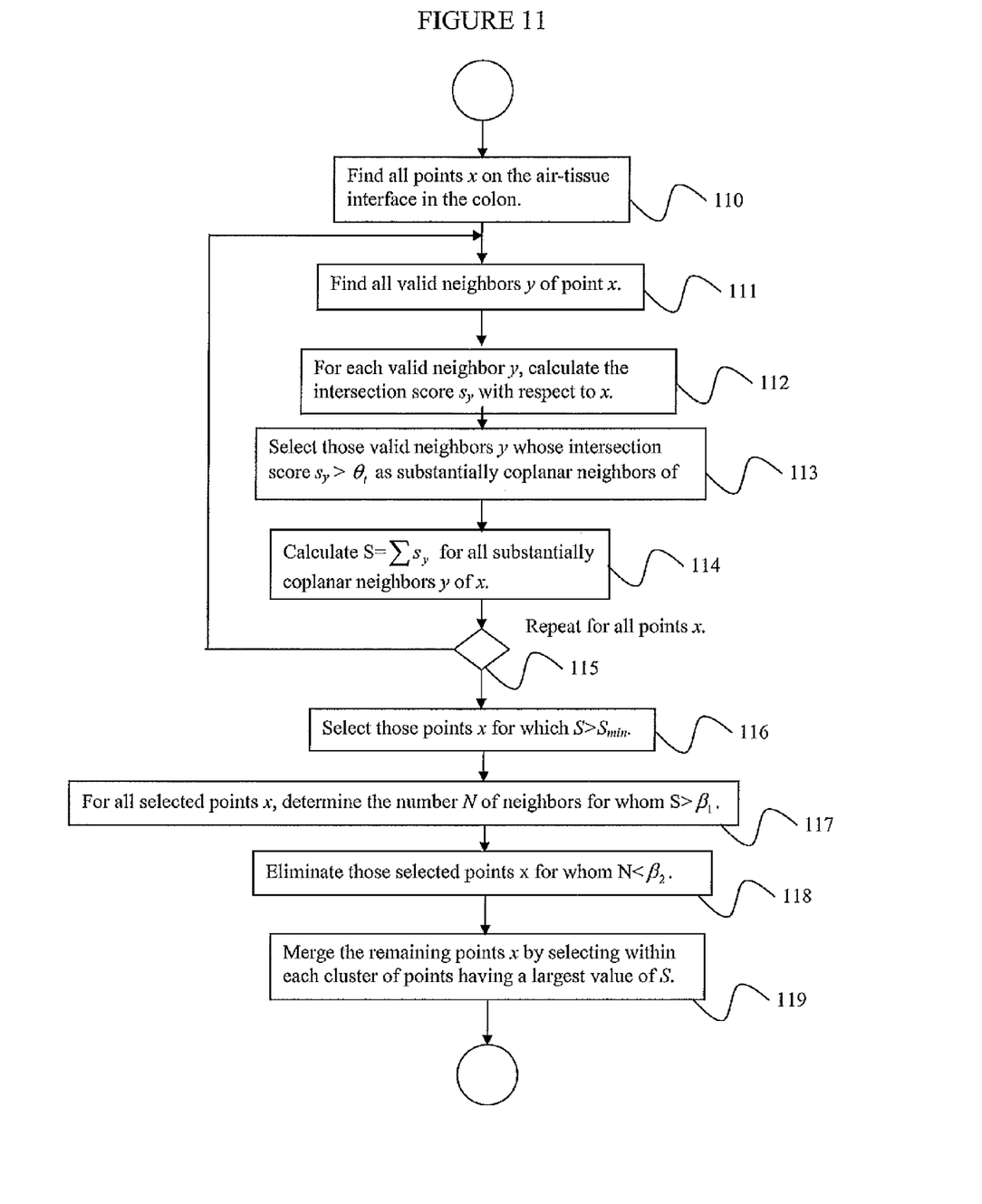
FIG. 11 is a flowchart of a method for generating candidates and features for growth detection in digital image review such as polyp detection in a digital colonoscopy, according to an embodiment of the invention.

The above calculations can be represented by the flowchart of FIG. 11. FIG. 11 describes the steps in accordance with the disclosed method specifically for detection of polyps in a digital colonoscopy. However, this is merely exemplary, as the disclosed method can be used to detect growths in other areas of the body, namely at any visualizable tissue barrier. For the digital colonoscopy review of FIG. 11, the tissue barrier is the air-tissue barrier, but for other body locations, the tissue barrier can be the blood-tissue barrier or bone-tissue barrier, etc. Referring now to the figure, given a digital image of the colon, a method according to an embodiment of the invention begins at step 110 by finding all points x on the air-tissue interface with a sufficiently large gradient, as indicated by the conditions of EQ. (1). Next, at step 111, one finds the neighbors y of x that satisfy conditions (2.1) to (2.5). For each such neighbor y, the intersection score $s_y$, defined by EQ. (3) is calculated at step 112. At step 113, $s_y$ is compared with $\theta_t$ to select those neighbors that are also substantially coplanar with x. Then, the $s_y$'s for the substantially coplanar neighbors of x are summed to determine the candidate score S at step 114 according to EQ. (4). Steps 111 to 114 are repeated from step 115 for all candidate points x. At step 116, those candidate points for whom $S > S_{min}$ are selected. Then, at step 117, for all selected candidate points x, the number of neighbors N for who $S > \beta_1$ is determined. Those selected points x for whom $N < \beta_2$ are eliminated at step 118. At step 119, the remaining points x are merged by finding, within each cluster of points, the point with the highest candidate score S, as described above, and selecting that point as the point representative of the cluster of merged points. The merging can be represented by the following pseudo-code.

```
FOR ALL points x BEGIN
    x_merge = x
    S_merge = S(x)
    FOR ALL points y within a distance d of x BEGIN
        IF S(y) > S_merge THEN
            S_merge = S(y)
            x_merge = y
        END
    END
END
```

In addition, selected candidates with candidate score larger than a threshold, such as $\beta_1$ above, can be taken as candidates for further feature computation. Among the features for selected candidates are the candidate score S for each selected candidate, the number $N_v$ of valid neighbors, and the number $N_c$ of substantially coplanar neighbors. Among the features of a merged cluster are the number $N_M$ of candidates actually merged into a cluster, and the sum $S_{merge}$ of all candidate scores for each candidate merged into a cluster:

$$S_{merge} = \sum_{merged\ candidates} S.$$

Figure 6:
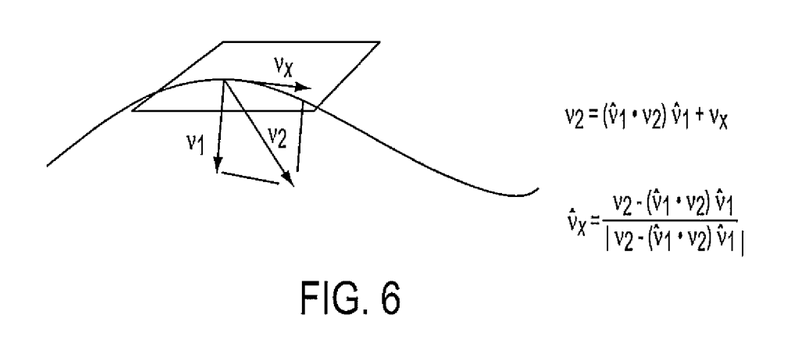
FIG. 6 is a schematic view of how the neighbor positions can be projected to the tangent plane at the candidate tip, according to an embodiment of the invention.

According to an embodiment of the invention, the symmetry of a cluster may be determined by considering a plurality of ring-like bands of increasing radius centered about the merged candidate point. According to an exemplary, non-limiting embodiment of the invention, there are ten ring-like bands of increasing radius, each having a width of 1 mm, about the merged candidate point. Within each band, one counts the number of valid neighbors, the number of substantially coplanar neighbors, and sums the candidate scores for all valid neighbors in the band. One can also project the gradient $v_2$ of each valid neighbor onto the plane normal to the gradient $v_1$ associated with the merged candidate point, which is tangent to the tip of the cluster, as shown in FIG. 6. The gradient $v_2$ can then be written as $v_2 = (\hat{v}_1 \cdot v_2)\hat{v}_1 + v_x$, with $v_x$ being the projected vector, and $$\hat{v}_x = \frac{v_2 - (\hat{v}_1 \cdot v_2)\hat{v}_1}{|v_2 - (\hat{v}_1 \cdot v_2)\hat{v}_1|},$$

where the hat symbol indicates a vector of unit magnitude. FIG. 6 is a schematic view of how the neighbor positions can be projected to the tangent plane at the candidate tip in order to be able to measure angular symmetry, height and height symmetry among voxels in a cluster. The resulting ring of outwardly projecting vectors is a measure of the relative symmetry of the merged cluster.

Figure 7A:
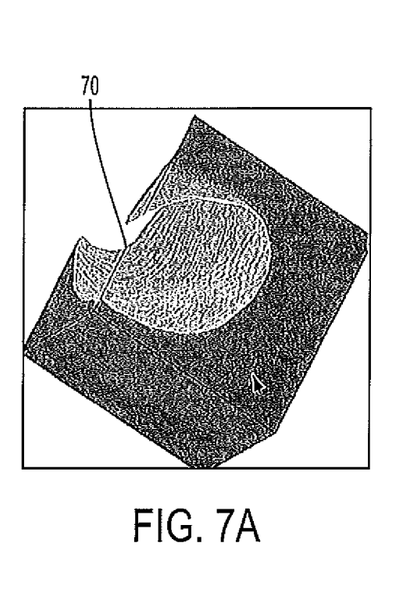
FIGS. 7(a)-(b) shows an example of a flat growth that is detected by a needle CG according to an embodiment of the invention.
Figure 7B:
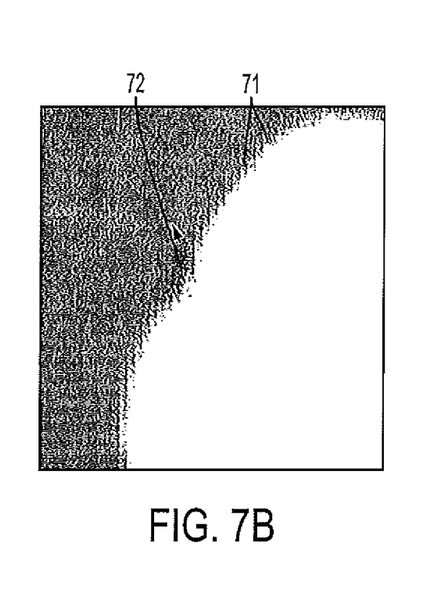
Figure 8A:
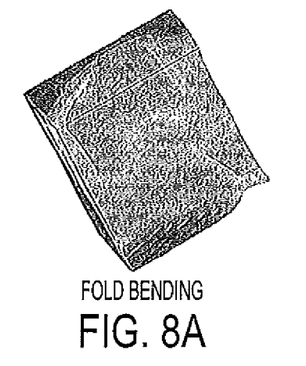
FIGS. 8(a)-(f) illustrate exemplary colon structures that yield false positive candidates that can be detected by a CG according to an embodiment of the invention.
Figure 8B:
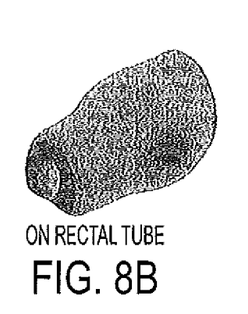
Figure 8C:
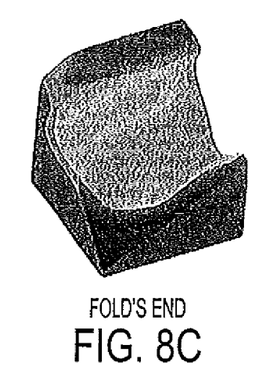
Figure 8D:
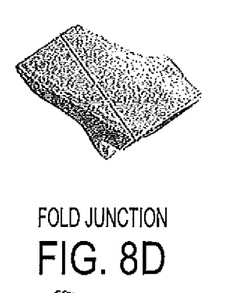
Figure 8E:
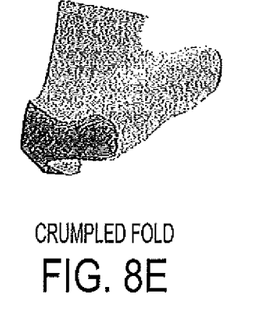
Figure 8F:
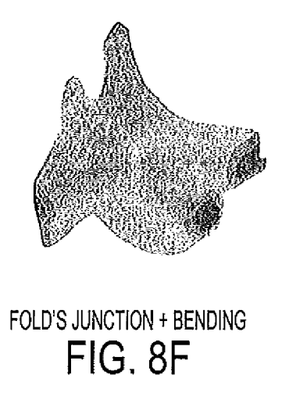
Figure 9A:
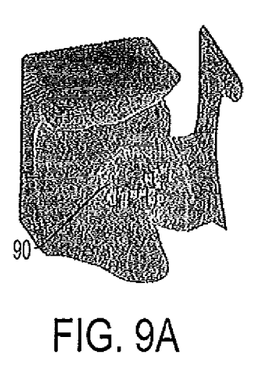
FIGS. 9(a)-(f) depicts some clusters obtained by a needle CG according to an embodiment of the invention for various false positive marks and true polyps.
Figure 9B:
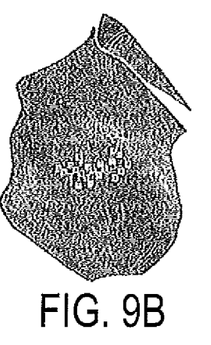
Figure 9C:
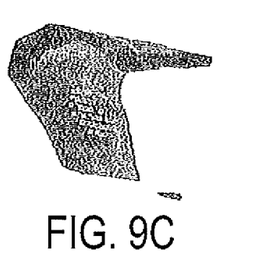
Figure 9D:
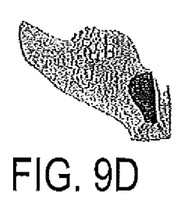
Figure 9E:
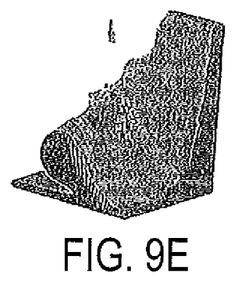
Figure 9F:
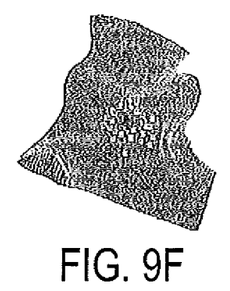

FIGS. 7(a)-(b) shows an example of a challenging flat growth 70 (FIG. 7(a)) that is detected by a CG (FIG. 7(b)) according to an embodiment of the invention, previously missed using a cutting planes CG. The arrows 71 in FIG. 7(b) represent the gradients whose of points of intersections are being sought, and the point 72 is the growth tip.

The above features computed from the selected candidate points and merged candidates enable identification of certain anatomical structures that can yield false positive candidates. For example, FIGS. 8(a)-(f) illustrate colon structures that yield false positive candidates that can be detected by a CG according to an embodiment of the invention. Among these structures are fold bending (FIG. 8(a)), a balloon at the end of a rectal tube (FIG. 8(b)), the end of a fold (FIG. 8(c)), two folds coming together at a junction (FIG. 8(d)), a crumpled fold (FIG. 8(e)), and a fold junction that is also bent (FIG. 8(f)). FIGS. 9(a)-(f) depicts some clusters obtained for various false positive candidates and true positive candidates by a needle CG according to an embodiment of the invention. In particular, FIGS. 9(a) and (b) on the top row depict false positive structures, FIGS. 9(c) and (d) in the middle row depict true growths or polyps, and the bottom row of figures, FIGS. 9(e) and (f) depict false positive structures. The darkened squares 90 in the structures represent candidate points. For clarity purposes, the squares are only indicated for FIG. 9(a). The relative asymmetry of false positive structures and symmetry of the true polyps may be seen from the distribution of candidate points in the figures.

Performance

Figure 10:
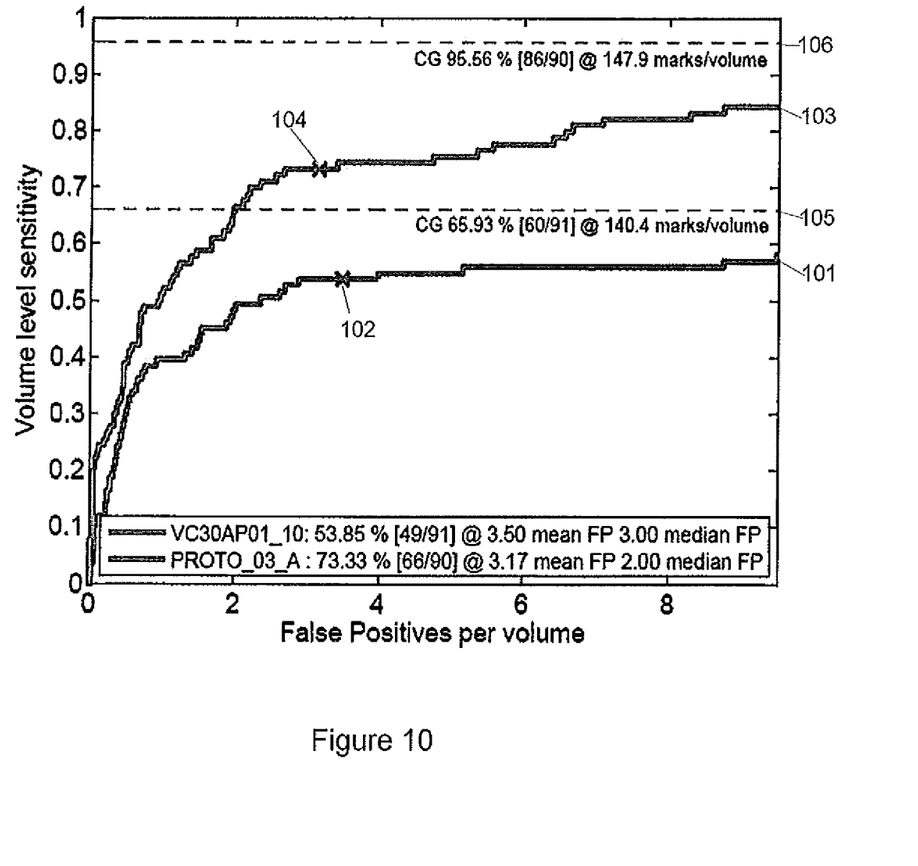
FIG. 10 is a graph that illustrates a performance improvement of a needle CG according to an embodiment of the invention with respect to a prior art CG.

FIG. 10 is a graph that shows the performance improvement on flat growths on a testing set of a baseline CAD system using a prior art CG and a CAD system using a needle CG according to an embodiment of the invention. The graph plots a volume level sensitivity as a function of the number of false positive per volume for the baseline CAD system 101 and for a CAD system using a needle CG 103 according to an embodiment of the invention. The dotted lines 105 and 106 represent the limiting values of plots 101 and 103, respectively, if extended to the right past the border of the graph. It may be seen from the plot for the baseline CAD system that it will detect 65.93% of the true growths or polyps in a sample of approximately 140 candidates, with an operating point 102 of 54% sensitivity at a mean false positive value of 3.5 per volume. Similarly, the plot for a CAD system using a needle CG according to an embodiment of the invention will detect 95.56% of the true growths or polyps in a sample of approximately 148 candidates, with an operating point 104 of 73% sensitivity at a mean false positive value of 3.17 per volume.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 12:
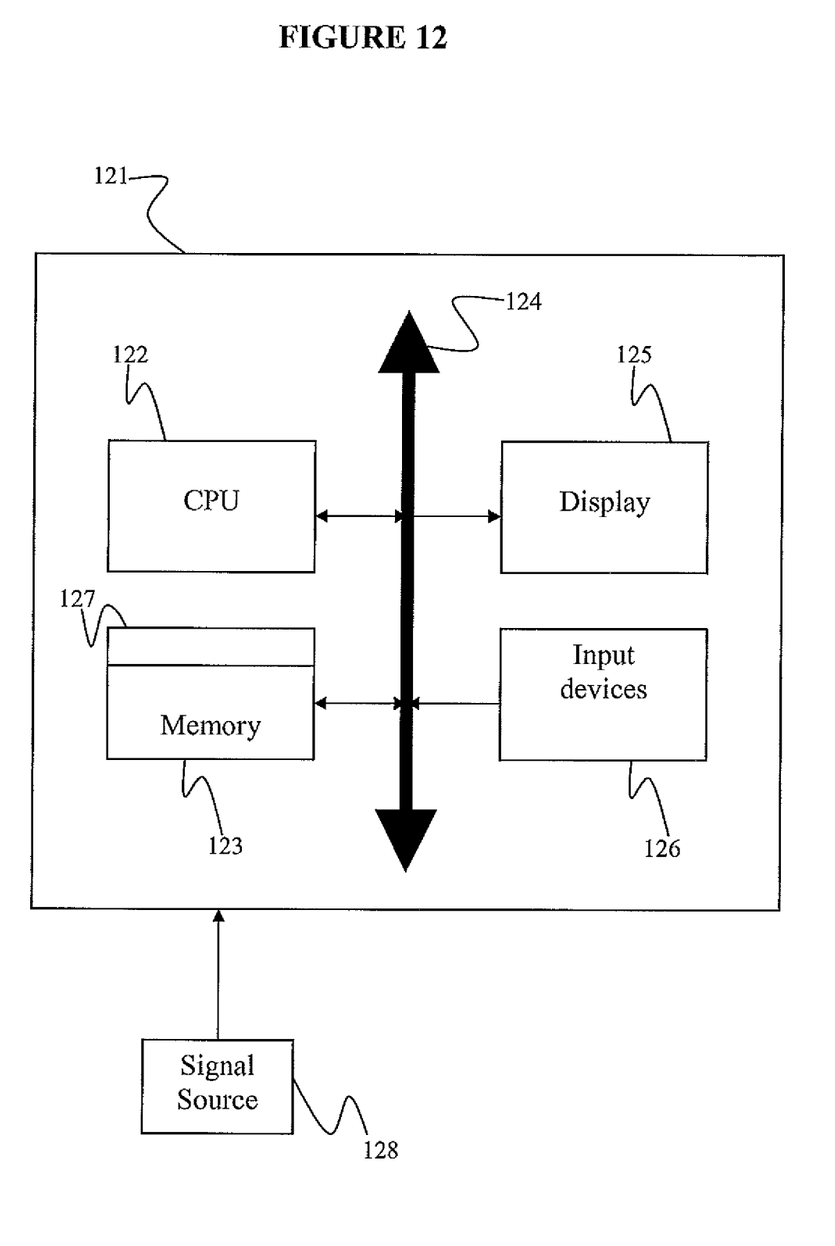
FIG. 12 is a block diagram of an exemplary computer system for implementing a method for generating candidates and features for growth detection in digital image review such as polyp detection in a digital colonoscopy, according to an embodiment of the invention.

FIG. 12 is a block diagram of an exemplary computer system for implementing a method for generating candidates from a digital image, such as in digital colonoscopy, according to an embodiment of the invention. Referring now to FIG. 12, a computer system 121 for implementing the present invention can comprise, inter alia, a central processing unit (CPU) 122, a memory 123 and an input/output (I/O) interface 124. The computer system 121 is generally coupled through the I/O interface 124 to a display 125 and various input devices 126 such as a mouse and a keyboard. The support circuits can include circuits such as cache, power supplies, clock circuits, and a communication bus. The memory 123 can include random access memory (RAM), read only memory (ROM), disk drive, tape drive, etc., or a combinations thereof. The present invention can be implemented as a routine 127 that is stored in memory 123 and executed by the CPU 122 to process the signal from the signal source 128. As such, the computer system 121 is a general purpose computer system that becomes a specific purpose computer system when executing the routine 127 of the present invention.

The computer system 121 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of generating candidates from a digital image by a computer system, comprising:
    acquiring by a computer system at least one digital image;
    analyzing, by the computer system, at least one point x that may lie on a polypoid structure, and determining, by the computer system, whether the point x satisfies a first predetermined set of conditions;
    for each point x that satisfies the predetermined set of conditions, identifying, by the computer system, each neighbor point y within a predetermined distance of point x that satisfies a second predetermined set of conditions;
    determining, by the computer system, a gradient vector $v_1$ for point x and identifying, by the computer system, a first half-line to which the gradient vector $v_1$ belongs;
    determining, by the computer system, a gradient vector $v_2$ for point y and identifying, by the computer system, a second half-line to which the gradient vector $v_2$ belongs;
    calculating, by the computer system, an intersection score that represents how close the first and second half-lines come to intersecting; and
    identifying and outputting, by the computer system, point x as a candidate when a candidate score is greater than a predetermined value, wherein the candidate score is the sum of intersection scores for all neighbor points y.

2. The method of claim 1, wherein determining whether a point x satisfies the first predetermined set of conditions comprises:
    determining, by the computer system, that the point x is located on the air-tissue interface; and
    determining, by the computer system, that the point x has a gradient magnitude greater than a predetermined gradient value.

3. The method of claim 2, wherein determining, by the computer system, that the point x is located on the air-tissue interface further comprises determining, by the computer system, that an image intensity at the point x is greater than a first intensity threshold and less than a second intensity threshold.

4. The method of claim 1, wherein determining whether a point y satisfies the second predetermined conditions, comprises:
    determining, by the computer system, that the point y is located on the air-tissue interface;
    determining, by the computer system, that the point y has a gradient magnitude greater than a predetermined gradient value;
    determining, by the computer system, that the point y is located within a predetermined distance range of the point x;
    determining, by the computer system, that the point y is located below the point x; and
    determining, by the computer system, that an angle between gradient vector $v_1$ and gradient vector $v_2$ is within a predetermined angle range.

5. The method of claim 4, wherein determining that the point y is located on the air-tissue interface further comprises determining that an image intensity at the point y is greater than a first intensity threshold and less than a second intensity threshold.

6. The method of claim 4, wherein determining, by the computer system, that the point y is located below the point x further comprises determining that $v_1 \cdot (y-x) > 0$.

7. The method of claim 1, further comprising:
    determining, by the computer system, that a point x identified as a candidate is within a predetermined distance of at least one neighbor point x also identified as a candidate; and
    merging, by the computer system, together those points x each identified as a candidate into a single merged candidate.

8. The method of claim 7, wherein merging, by the computer system, together those points x each identified as a candidate comprises, for each point x identified as a candidate:
    initializing, by the computer system, a merged score as the candidate score of a current selected candidate point x; and
    for each neighbor point x identified as a candidate, resetting, by the computer system, the merged score to the candidate score for the neighbor candidate point x if the candidate score for the neighbor candidate point x is greater than the merged score.

9. The method of claim 7, further comprising, for each selected candidate point x, counting, by the computer system, a number N of neighboring candidate points x that are within a maximum merge distance of the selected point x and retaining those selected candidate points x for whom the number N is greater than a predetermined minimum merge count.

10. The method of claim 1, wherein the intersection score is defined by $$-\frac{v_1 \times (y-x)}{|v_1 \times (y-x)|} \cdot \frac{v_1 \times v_2}{|v_1 \times v_2|},$$

wherein $v_1$ is the gradient vector at point x and $v_2$ is the gradient vector at point y.

11. The method of claim 1, wherein analyzing, by the computer system, at least one point x further comprises analyzing, by the computer system, all points in the digital image that may lie on a polypoid structure, and determining, by the computer system, whether each point satisfies a first predetermined set of conditions.

12. A program storage device readable by a computer, tangibly embodying a program of instructions executable by the computer to perform the method steps for generating candidates from a digital image, the method comprising the steps, implemented by the computer, of:
   acquiring at least one digital image;
   analyzing at least one point x that may lie on a polypoid structure, and determining whether the point x satisfies a first predetermined set of conditions;
   for each point x that satisfies the predetermined set of conditions, identifying each neighbor point y within a predetermined distance of point x that satisfies a second predetermined set of conditions;
   determining a gradient vector $v_1$ for point x and identifying a first half-line to which the gradient vector $v_1$ belongs;
   determining a gradient vector $v_2$ for point y and identifying a second half-line to which the gradient vector $v_2$ belongs;
   calculating an intersection score that represents how close the first and second half-lines come to intersecting; and
   identifying, and outputting, point x as a candidate when a candidate score is greater than a predetermined value, wherein the candidate score is the sum of intersection scores for all neighbor points y.

13. The computer readable program storage device of claim 12, wherein determining whether a point x satisfies the first predetermined set of conditions comprising:
   determining that the point x is located on the air-tissue interface; and
   determining that the point x has a gradient magnitude greater than a predetermined gradient value.

14. The computer readable program storage device of claim 13, wherein determining that the point x is located on the air-tissue interface further comprises determining that an image intensity at the point x is greater than a first intensity threshold and less than a second intensity threshold.

15. The computer readable program storage device of claim 12, wherein determining whether a point y satisfies the second predetermined conditions comprises:
   determining that the point y is located on the air-tissue interface;
   determining that the point y has a gradient magnitude greater than a predetermined gradient value;
   determining that the point y is located within a predetermined distance range of the point x;
   determining that the point y is located below the point x; and
   determining that an angle between gradient vector $v_1$ and gradient vector $V_2$ is within a predetermined angle range.

16. The computer readable program storage device of claim 15, wherein determining that the point y is located on the air-tissue interface further comprises determining that an image intensity at the point y is greater than a first intensity threshold and less than a second intensity threshold.

17. The computer readable program storage device of claim 15, wherein determining that the point y is located below the point x further comprises determining that $v_1 \cdot (y-x) > 0$.

18. The computer readable program storage device of claim 12, the method further comprising:
   determining that a point x identified as a candidate is within a predetermined distance of at least one neighbor point x also identified as a candidate; and
   merging together those points x each identified as a candidate into a single merged candidate.

19. The computer readable program storage device of claim 18, wherein merging together those points x each identified as a candidate comprises, for each point x identified as a candidate:
   initializing a merged score as the candidate score of a current selected candidate point x;
   for each neighbor point x identified as a candidate, resetting the merged score to the candidate score for the neighbor candidate point x if the candidate score for the neighbor candidate point x is greater than the merged score.

20. The computer readable program storage device of claim 18, the method further comprising, for each selected candidate point x, counting a number N of neighboring candidate points x that are within a maximum merge distance of the selected point x and retaining those selected candidate points x for whom the number N is greater than a predetermined minimum merge count.

21. The computer readable program storage device of claim 12, wherein the intersection score is defined by $$-\frac{v_1 \times (y-x)}{|v_1 \times (y-x)|} \cdot \frac{v_1 \times v_2}{|v_1 \times v_2|},$$

wherein $v_1$ is the gradient vector at point x and $v_2$ is the gradient vector at point y.

22. The computer readable program storage device of claim 12, wherein acquiring at least one point x further comprises considering all points in the digital image that may lie on a polypoid structure, and determining whether each point satisfies a first predetermined set of conditions.

* * * * *